(12) United States Patent
Yoshigahara

(10) Patent No.: US 8,154,747 B2
(45) Date of Patent: Apr. 10, 2012

(54) EXTERNAL TERMINAL CONTROL APPARATUS AND CONTROL METHOD THEREOF

(75) Inventor: Noriyuki Yoshigahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1041 days.

(21) Appl. No.: 12/062,755

(22) Filed: Apr. 4, 2008

(65) Prior Publication Data

US 2008/0252923 A1     Oct. 16, 2008

(30) Foreign Application Priority Data

Apr. 10, 2007   (JP) ................. 2007-102943

(51) Int. Cl.
*G06F 15/00* (2006.01)
*G06F 3/12* (2006.01)
*G06K 1/00* (2006.01)

(52) U.S. Cl. ...................................... 358/1.15; 358/1.13

(58) Field of Classification Search ...................... None
See application file for complete search history.

(56) References Cited

U.S. PATENT DOCUMENTS 6,460,179 B1 * 10/2002 Kretz et al. .................... 725/37
6,557,016 B2 * 4/2003 Tanigawa et al. ............. 715/246

FOREIGN PATENT DOCUMENTS

JP         7-177586 A      7/1995

* cited by examiner

*Primary Examiner* — Douglas Tran
(74) *Attorney, Agent, or Firm* — Canon U.S.A., Inc., IP Division

(57) ABSTRACT

An external terminal control apparatus associates a category which classifies menu information about a first group of menu screens for operating the external terminal control apparatus with address information corresponding to file data that configure a second group of menu screens for operating an external terminal to integrate menu items of the external terminal with the menu items of the external terminal control apparatus. The external terminal control apparatus adds a menu item corresponding to address information to the menu information according to the associated category.

12 Claims, 13 Drawing Sheets

FIG.2

| MENU ID | MENU CATEGORY | MENU NAME | JUMP DESTINATION |
|---|---|---|---|
| mid_01 | SYSTEM SETTING | "SYSTEM SETTING" | mid_02,mid_70 |
| mid_02 | STATUS DISPLAY | "SYSTEM STATUS" | mid_03,mid_04,mid_05,mid_69 |
| mid_03 | STATUS DISPLAY | "RECEPTION STATUS" | mid_90 |
| mid_04 | STATUS DISPLAY | "PURCHASED PROGRAM INFORMATION" | mid_91 |
| mid_05 | STATUS DISPLAY | "BCAS CARD INFORMATION" | mid_92 |
| ⋮ | ⋮ | ⋮ | ⋮ |
| mid_69 | STATUS DISPLAY | "DOWNLOAD INFORMATION" | mid_93 |
| mid_70 | SYSTEM SETTING | "VARIOUS SETTINGS" | mid_71,mid_72,mid_73 |
| mid_71 | OTHERS | "CHANNEL SELECT SETTING" | mid_94 |
| mid_72 | OTHERS | "PARENTAL LEVEL SETTING" | mid_95 |
| mid_73 | OTHERS | "ENERGY SAVING SETTING" | mid_96 |

FIG.5

```
<html>
    .
    .
<LI id=print_setting>
   <A href="http://172.xx.xx.xx/print_setting/index.html">
   <IMG height=23 alt=PRINT SETTING src="PRINT SETTING.files/print_setting.gif">
width=122 name=me003>
   </A>
</LI>
    .
    .
</html>
```

FIG.6

| LINK ID | ADDRESS INFORMATION | MENU CATEGORY | SUB-MENU NAME |
|---|---|---|---|
| lid_printer_A_01 | href="http://172.xx.xx.xx/print_setting/index.html" | FUNCTION SETTING | PRINT SETTING |
| lid_printer_A_02 | href="http://172.xx.xx.xx/network_setting/index.html" | INSTALLATION SETTING | NETWORK SETTING |
| lid_printer_A_03 | href="http://172.xx.xx.xx/proxy_setting/index.html" | INSTALLATION SETTING | PROXY SETTING |
| lid_printer_A_04 | href="http://172.xx.xx.xx/status/index.html" | STATUS DISPLAY | PRINT STATUS |
| lid_printer_A_05 | href="http://172.xx.xx.xx/head_cleaning/index.html" | OTHERS | HEAD CLEANING |

FIG.7

KEYWORD LIST      NOTE: '*' INDICATES ARBITRARY CHARACTER STRING INCLUDING NULL STRING

| MENU CATEGORY | KEYWORD |
|---|---|
| FUNCTION SETTING | *FUNCTION SETTING*, *PAPER*, *PRINT*, *DIRECTION*, *QUALITY*, *IMAGE QUALITY*, *TWO-SIDED* |
| INSTALLATION SETTING | *INSTALLATION SETTING*, *INITIAL*SETTING*, *INITIAL*REGISTRATION*, *NET*SETTING*, *NET*ADDRESS*, *IP*SETTING* |
| STATUS DISPLAY | *STATE*, *STATUS*, *REMAINING AMOUNT*, *CONFIRM*VALUE*, *JOB* |

FIG.8

```
<html>
   .
   .
   .
<LI id=print_setting>
   <A href="http://172.xx.xx.xx/print_setting/index.html">
   <IMG height=23 alt=PRINT SETTING src="PRINT SETTING.files/print_setting.gif">
width=122 name=me003>
   </A>
</LI>
   .
   .
   .
</html>
```

FIG.10

| MENU ID | MENU CATEGORY | MENU NAME | JUMP DESTINATION |
|---|---|---|---|
| mid_01 | SYSTEM SETTING | "SYSTEM SETTING" | mid_02,mid_70,mid_102 |
| mid_02 | STATUS DISPLAY | "SYSTEM STATUS" | mid_03,mid_04,mid_05,mid_69,mid_101 |
| mid_03 | STATUS DISPLAY | "RECEPTION STATUS" | mid_90 |
| mid_04 | STATUS DISPLAY | "PURCHASED PROGRAM INFORMATION" | mid_91 |
| mid_05 | STATUS DISPLAY | "BCAS CARD INFORMATION" | mid_92 |
| ... | ... | ... | ... |
| mid_69 | STATUS DISPLAY | "DOWNLOAD INFORMATION" | mid_93 |
| mid_70 | SYSTEM SETTING | "VARIOUS SETTINGS" | mid_71,mid_72,mid_73,mid_104 |
| mid_71 | OTHERS | "CHANNEL SELECT SETTING" | mid_94 |
| mid_72 | OTHERS | "PARENTAL LEVEL SETTING" | mid_95 |
| mid_73 | OTHERS | "ENERGY SAVING SETTING" | mid_96 |
| mid_101 | STATUS DISPLAY | "DISPLAY PRINTER STATUS" | mid_105 |
| mid_102 | FUNCTION SETTING | "PRINTER FUNCTION SETTING" | mid_106 |
| mid_103 | INSTALLATION SETTING | "PRINTER INSTALLATION SETTING" | mid_106,mid_107,mid_108 |
| mid_104 | OTHERS | "VARIOUS PRINTER SETTINGS" | mid_109 |
| mid_105 | STATUS DISPLAY | "PRINT STATUS" | lid_printer_A_04 |
| mid_106 | INSTALLATION SETTING | "PRINT SETTING" | lid_printer_A_01 |
| mid_107 | INSTALLATION SETTING | "NETWORK SETTING" | lid_printer_A_02 |
| mid_108 | INSTALLATION SETTING | "PROXY SETTING" | lid_printer_A_03 |
| mid_109 | OTHERS | "HEAD CLEANING" | lid_printer_A_05 |

MENU SCREENS STORED IN PRINTER

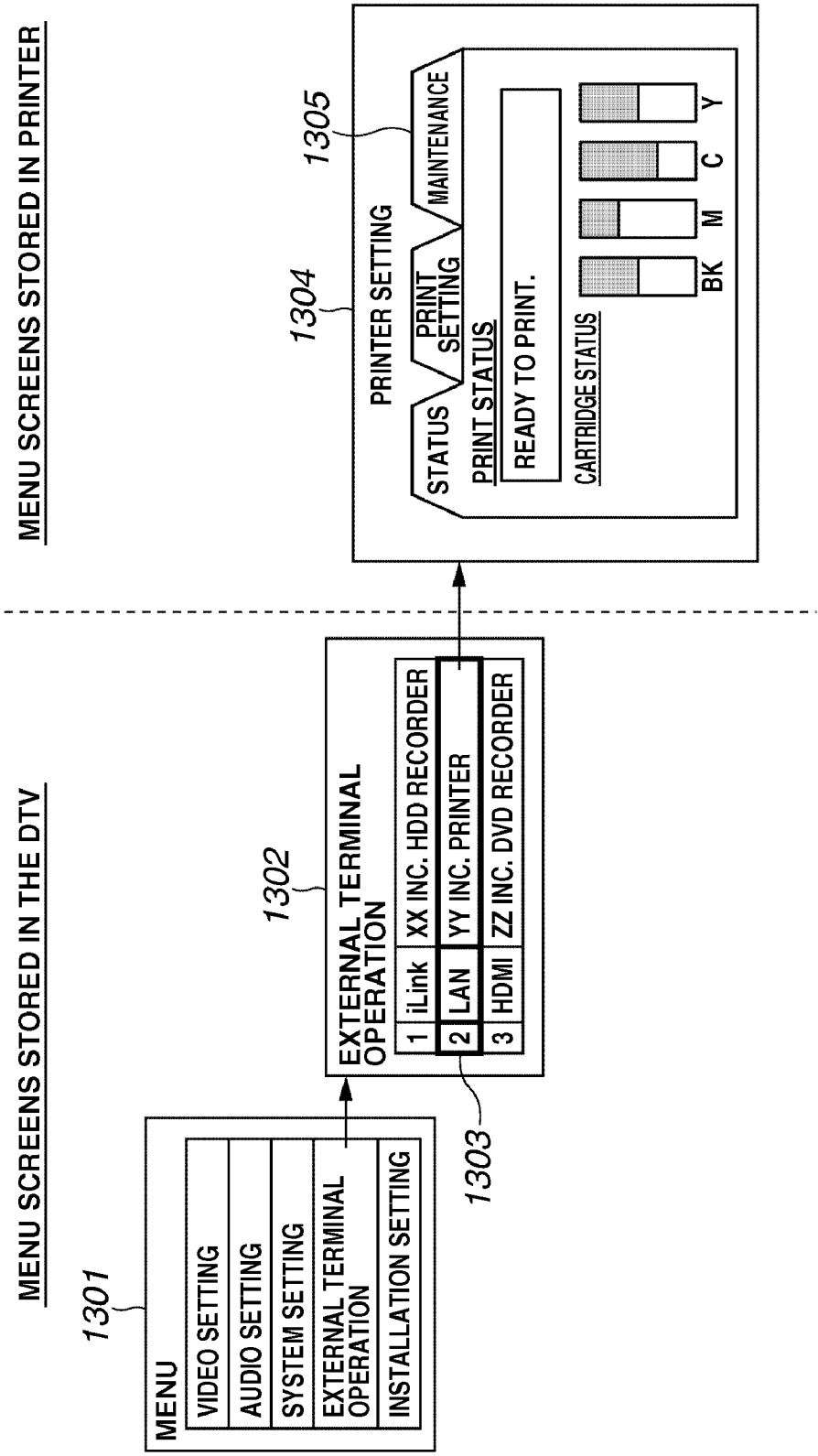

EXTERNAL TERMINAL CONTROL APPARATUS AND CONTROL METHOD THEREOF

BACKGROUND OF THE INVENTION

1. Field of the Invention

The present invention relates to an external terminal control apparatus communicably connected to an external apparatus and controls the external apparatus, and a control method thereof. In particular, the present invention relates to an external terminal control apparatus that acquires information about an external terminal and displays a status of the external terminal or operates the external terminal, and a control method thereof.

2. Description of the Related Art

Conventionally, there is an external terminal control apparatus that is connected to an external terminal, such as a printer, that can communicate with the terminal control apparatus, and displays information stored in the external terminal or operates the external terminal. An example of an external terminal control apparatus is a personal computer (PC).

Moreover, in recent years, a television printer that is connected to and can communicate with a digital television (DTV) is in market. Such a television printer can print a print content included in digital broadcasting that is received by the DTV. In the Japanese market, Digital TV Informatization Research Group (http://nw-dtv.jp/) formulates terminal specifications and communication specifications of DTVs and television printers, and specification for information transmitted and received between DTVs and television printers. Such specifications are issued by the Digital TV Informatization Research Group as documents, e.g., a Net TV terminal specification and a Net TV guideline. Manufacturers of DTVs and printers conduct research and development of products conforming to the contents of such documents.

According to the released Net TV terminal specification version 2.0, a printer is required to provide an index page to a Net TV terminal, e.g., DTV. The index page of a Net TV terminal is described in a HyperText Markup Language (HTML). Consequently, an HTML page which is designated by the index page or a linked page of an HTML page provides the DTV with functions for displaying a printer status, setting a print condition, or executing a maintenance function. That is, the index page and the linked page to the index page configure a menu screen that displays various operations and status of a printer for a user. As described above, a printer holds a menu screen for a Net TV terminal as file data which is described in a markup language.

A DTV, or a Net TV terminal, includes a browser that interprets and displays an HTML file. Further, a DTV acquires an index page stored in a printer and displays the index page on a television screen through the browser. A user uses a remote controller to jump to an index page or to a page linked to the index page, or input an operation that can be executed on each page.

In a case where a DTV that conforms to Net TV specification is connected to a printer, the DTV uses a presentation uniform resource identifier (URI) to acquire from the printer a uniform resource locator (URL) or address information of an index page. That is, the printer notifies the DTV of the URL of the index page.

The DTV stores the acquired URL of the index page in a manageable storage area. An operation menu screen of the DTV includes menu items that are used to operate an external terminal. When a user selects a printer from the menu items, the DTV reads out the stored URL of the index page and issues a command to the printer for acquiring the index page. Upon acquiring the index page in HTML form from the printer, the DTV activates the browser and interprets and displays the index page.

FIG. 13 illustrates an example of a menu that is displayed as described above. If a user selects a menu item "external terminal operation" in an operation menu screen 1301 of a DTV, the DTV displays an external terminal list screen 1302 that lists external terminals connected to the DTV. If the user then selects "printer" 1303 which conforms to the Net TV specification, the DTV requests a printer to acquire an HTML file corresponding to an index page, using an URL of the index page previously stored in the DTV. An index page 1304 is then rendered based on the acquired HTML file and displayed on the browser of the DTV. As described above, the index page 1304 is a menu screen of the printer.

In FIG. 13, the browser displays a print status page that indicates a status of the printer and cartridges as an index page. If a user selects a link to "maintenance" 1305 by operating on a remote controller, the browser, by using a URL of a linked page that is described in an HTML file of the index page, issues a command to the printer to acquire an HTML file of the linked page.

That is, the DTV does not store a menu described in a markup language that is included in the printer. The DTV only holds a URL of the index page 1304 of the printer and cannot directly access the linked pages that are related to the index page.

Japanese Patent Application Laid-Open No. 07-177586 discusses a remote control apparatus that consolidates menu information of a plurality of external terminals. The remote control apparatus acquires menu information and control information of each of the external terminals, and hierarchically holds the acquired menu information and control information. Moreover, in a case where the remote control apparatus acquires new menu information and control information, the remote control apparatus restructures the stored menu information and control information according to a rule.

As described above, according to the present Net TV specification, a DTV only holds the URL of the index page of a printer. As a result, if a user wishes to display other operation menus that are linked to an index page, the user needs to acquire a menu screen stored in a printer after selecting an external terminal menu. The user then needs to trace menus to the desired operation, step by step, from the index page.

Moreover, a DTV holds menu screens and menu items for maintenance and various settings of the DTV. Consequently, a user may misunderstand that menu items for maintenance and various settings of a printer are also included in the menu screen for maintenance and various settings specific to the DTV. However, according to the present Net TV specification, a DTV maintenance menu and a printer menu will not be integrated. Therefore, a user needs to always be conscious of a terminal that the user wishes to operate and start operation from selecting a menu of the terminal.

For example, in a case where a user buys a DTV and a printer and makes respective settings, the user needs to always start from an external terminal menu to approach a menu item for setting the printer, even if there are similar menu items between the DTV and the printer. Therefore, the present Net TV specification does not realize user-friendliness.

Japanese Patent Application Laid-Open No. 07-177586 discusses a solution to the above-described problem. However, the technique discussed in Japanese Patent Application Laid-Open No. 07-177586 is based on the premise that operation menus of external terminals are integratably structured in a remote controller. For example, each external terminal needs to be designed based on a rule that a menu is to be described in a markup language specified for creating the menu. That is, an external terminal which is not designed for integration cannot perform menu integration discussed in Japanese Patent Application Laid-Open No. 07-177586.

Further, a remote controller discussed in Japanese Patent Application Laid-Open No. 07-177586 holds a menu that is structured according to each terminal, such as a television or a video recorder. Therefore, a remote controller must establish a menu for each terminal, even if there is a common menu item between the terminals, e.g., a maintenance menu. Thus, a user needs to always be conscious of the terminal that the user wishes to operate and to start operation from selecting a menu of the terminal. Therefore, the above-described problem of the NET TV specification is not solved.

SUMMARY OF THE INVENTION

The present invention is directed to an external terminal control apparatus that can integrate menu items of an external terminal with the menu items of the external terminal control apparatus without setting a special rule, and a control method thereof. A user can thus operate on an external terminal without regard to the difference in terminals.

According to an aspect of the present invention, an external terminal control apparatus includes a holding unit configured to hold menu information of a first group of menu screens for operating an external terminal control apparatus, wherein the menu information is classified into a predetermined plurality of categories, a file acquisition unit configured to acquire file data that configure a second group of menu screens for operating an external terminal, an address acquisition unit configured to acquire address information corresponding to each of the file data, a determination unit configured to associate the plurality of categories with address information acquired by the address acquisition unit, and a control unit configured to add a menu item corresponding to the address information to the menu information according to a category associated with the address information by the determination unit.

According to another aspect of the present invention, a method for controlling an external terminal control apparatus includes holding menu information of a first group of menu screens for operating the external terminal control apparatus, wherein the menu information is classified into a predetermined plurality of categories, acquiring file data that configure a second group of menu screens for operating an external terminal, acquiring address information corresponding to each file data, associating the plurality of categories with acquired address information, and adding a menu item corresponding to the address information to the menu information according to the plurality of categories associated with the address information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example of a menu configuration list that is held in a DTV according to an exemplary embodiment of the present invention.

FIG. 5 illustrates an example content of an HTML file that corresponds to a menu screen of a printer according to an exemplary embodiment of the present invention.

FIG. 6 illustrates an example of an address information list according to an exemplary embodiment of the present invention.

FIG. 7 illustrates an example of a keyword list according to an exemplary embodiment of the present invention.

FIG. 8 illustrates an example content of an HTML file that corresponds to a menu screen of a printer according to an exemplary embodiment of the present invention.

FIG. 10 illustrates an example of a reconfigured menu configuration list according to an exemplary embodiment of the present invention.

FIG. 13 illustrates an example schematic diagram of a conventional menu screen and conventional screen transition information.

DETAILED DESCRIPTION OF THE EMBODIMENTS

Various exemplary embodiments, features, and aspects of the invention will be described in detail below with reference to the drawings.

Figure 1:
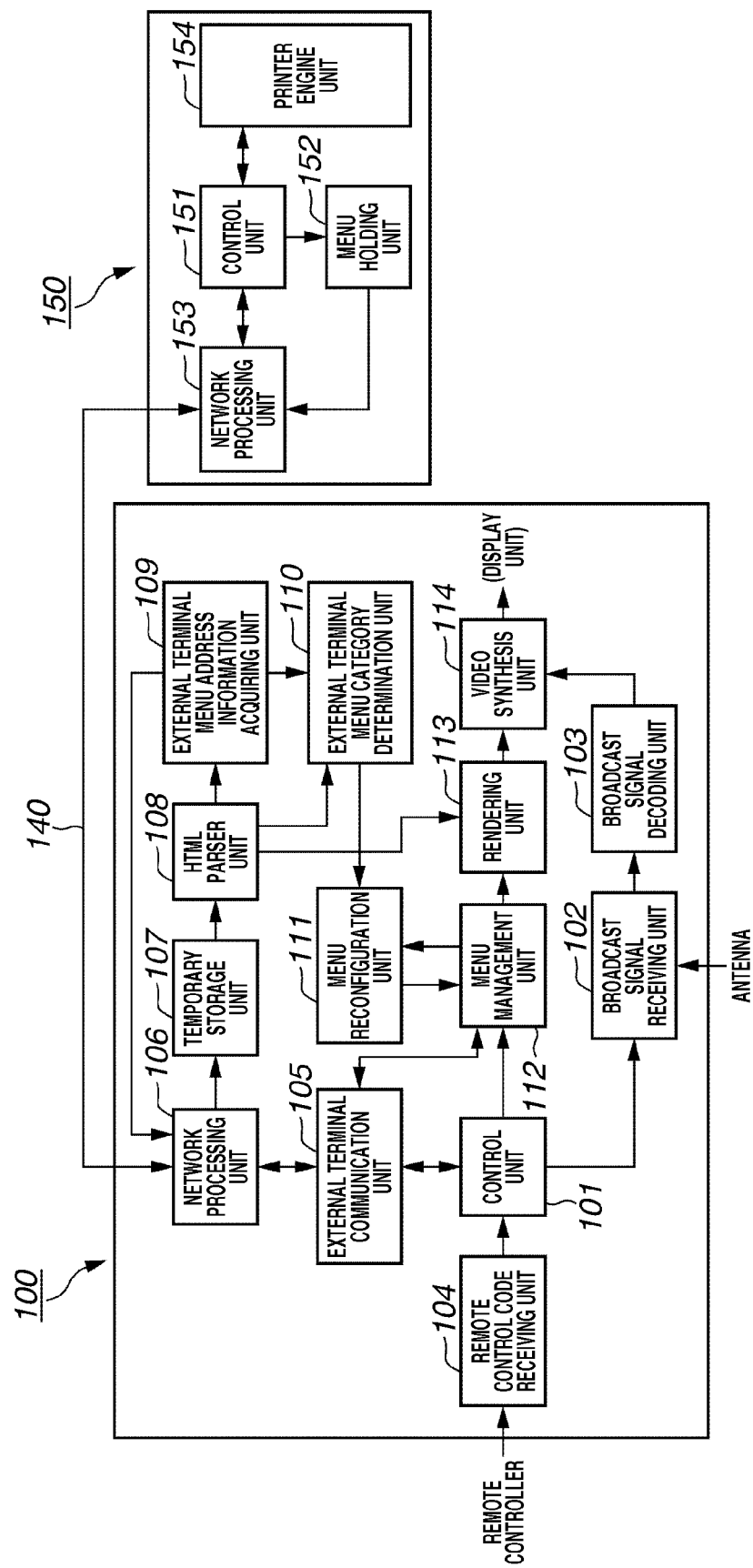
FIG. 1 is an example of a system configuration according to an exemplary embodiment of the present invention.

FIG. 1 illustrates an exemplary configuration of a system that includes a DTV 100 which is an external terminal control apparatus, and a printer 150 which is an external terminal, according to an exemplary embodiment of the present invention. In the present exemplary embodiment, an external terminal is the printer 150 which can be connected to a network. However, an external terminal in the present invention is not limited to a printer.

Further, in the present embodiment, the DTV 100 and the printer 150 conform to the Net TV specification. However, the present invention is not limited to apparatuses that conform to the Net TV specification.

Referring to FIG. 1, the DTV 100 includes a control unit 101 that controls the entire DTV 100. The control unit 101 is connected to a broadcast signal receiving unit 102, a remote control code receiving unit 104, and a menu management unit 112. The control unit 101 performs control of all function blocks.

The broadcast signal receiving unit 102 receives a broadcast signal via an external antenna. While the present invention describes receipt of broadcast signal via an external antenna, any other means of receiving a broadcast signal such as via a cable television or satellite television system is applicable. The broadcast signal received by the broadcast signal receiving unit 102 is then sent to a broadcast signal decoding unit 103 which decodes the broadcast signal into a video signal. The decoded video signal is sent to a video synthesis unit 114 which outputs the received video signal to a display unit. The video synthesis unit 114 can synthesize and display a menu screen (to be described later) and a video signal, or can display only the menu screen on the display unit. While the present embodiment discusses a configuration based on a video signal, an actual DTV includes various configurations for processing an audio signal and a data broadcasting signal.

The remote control code receiving unit 104 receives a signal, such as an infrared light signal, that is transmitted from a remote controller. The remote control code receiving unit 104 converts the received signal into a remote control code, and then outputs the remote control code to the control unit 101.

An external terminal communication unit 105 communicates with an external terminal connected to the DTV 100. The external terminal communication unit 105 transmits and receives data to and from an external terminal, via a network processing unit 106 which functions as a communication interface. The network processing unit 106 communicates with a network processing unit included in the external terminal via a local area network (LAN) 140.

A temporary storage unit 107 is a memory that temporarily stores information received from the external terminal. In the present embodiment, the temporary storage unit 107 stores menu information of the printer 150 as an HTML file that is acquired from the printer 150.

An HTML parser unit 108 acquires an HTML file stored in the temporary storage unit 107 and analyzes the content of the HTML file. The result of the analysis by the HTML parser unit 108 is output to an external terminal menu address information acquiring unit 109, an external terminal menu category determination unit 110, and a rendering unit 113.

The external terminal menu address information acquiring unit 109 acquires address information included in the HTML file analyzed by the HTML parser unit 108. The address information is a part of menu information. Operation of the external terminal menu address information acquiring unit 109 is described below.

The external terminal menu category determination unit 110 determines a menu category of address information corresponding to a menu screen stored in the external terminal, based on information acquired from the HTML parser unit 108 and the external terminal menu address information acquiring unit 109. Operation of the external terminal menu category determination unit 110 is described below.

A menu reconfiguration unit 111 acquires address information and category information output from the external terminal menu category determination unit 110, and reconfigures a menu of the DTV 100 that is stored and managed by the menu management unit 112. Initially, the menu management unit 112 stores and manages menu information specific to the DTV 100. However, after the menu reconfiguration unit 111 reconfigures a menu, the menu management unit 112 stores and manages reconfigured menu information. Menu information of the DTV 100 has a hierarchical structure. As described above with reference to FIG. 13, detailed menu items that correspond to each of menu category items e.g., video setting, audio setting, system setting, external terminal operation, and installation setting, are provided as an example of a hierarchical structure. All of the menu items are displayed to the user on the menu screens.

The rendering unit 113 acquires menu information that is managed by the menu management unit 112 according to instruction from the control unit 101, and performs rendering to display the acquired menu information on a display unit. Further, the rendering unit 113 includes a function as an HTML browser which renders an HTML file that corresponds to a menu screen of the printer 150, according to an HTML file analysis result acquired from the HTML parser unit 108.

Now, a configuration of the printer 150 as an external terminal will be described. The printer 150 includes a control unit 151 that controls the entire printer. Further, the printer 150 includes a printer engine unit 154 that prints data sent from the DTV 100. The control unit 151 acquires, among other things, status information and information about remaining amounts of ink in the ink cartridges (not shown) of the printer 150 from the printer engine unit 154, and can reflect the acquired information on menu information held in a menu holding unit 152.

The menu holding unit 152 holds a menu of the printer 150. In the present embodiment, the menu of the printer 150 is described in an HTML format. That is, each of the menu screens of the printer 150 corresponds to an index page and various menu pages linked to the index page according to the Net TV specification. Each of such pages is held in the menu holding unit 152 in an HTML file format to which an address information is assigned. The address information includes an HTML file name and a file path that indicates a storage destination of the file.

A network processing unit 153 is an interface through which the printer 150 communicates with the DTV 100 or another terminal (not illustrated). In the present embodiment, an HTML file held in the menu holding unit 152 can be sent to the DTV 100 via the LAN 140 according to an instruction from the DTV 100.

Generally, in a case where a user operates a menu screen of the DTV 100, the control unit 101 acquires a user instruction to display a menu screen input from a remote controller. The control unit 101 instructs the menu management unit 112 to display a menu screen in a higher hierarchy, such as the screen 1301 illustrated in FIG. 13. The menu management unit 112 outputs menu information of the instructed menu screen to the rendering unit 113 according to an instruction from the control unit 101. The rendering unit 113 then renders and displays a screen on a display unit based on the menu information acquired from the menu management unit 112.

Further, each time a user operates a remote controller and moves a cursor or selects a specific menu on a menu screen, the control unit 101 instructs the menu management unit 112 to display a menu screen that corresponds to the user operation.

An initial menu structure stored in the menu management unit 112 of the DTV 100 and a menu structure held in the menu holding unit 152 of the printer 150 will be described below.

FIG. 2 illustrates an example of a menu configuration list that represents menu information stored in the menu management unit 112 which manages a group of menu screens of the DTV 100. The menu management unit 112 of the DTV 100 uses the menu configuration list to display a menu screen or perform screen transition as designated by a user.

The menu configuration list includes four items as menu information, i.e., menu identification number (ID), menu category, menu name, and jump destination. A menu ID corresponds to a menu screen and a unique menu ID is assigned to each of all menu screens included in the DTV 100. A menu category is category information to classify each menu into a predetermined unit of groups. A menu name is a name of each menu screen and displayed on each menu screen. A jump destination corresponds to a link for jumping from a menu screen to another menu screen.

Figure 3:
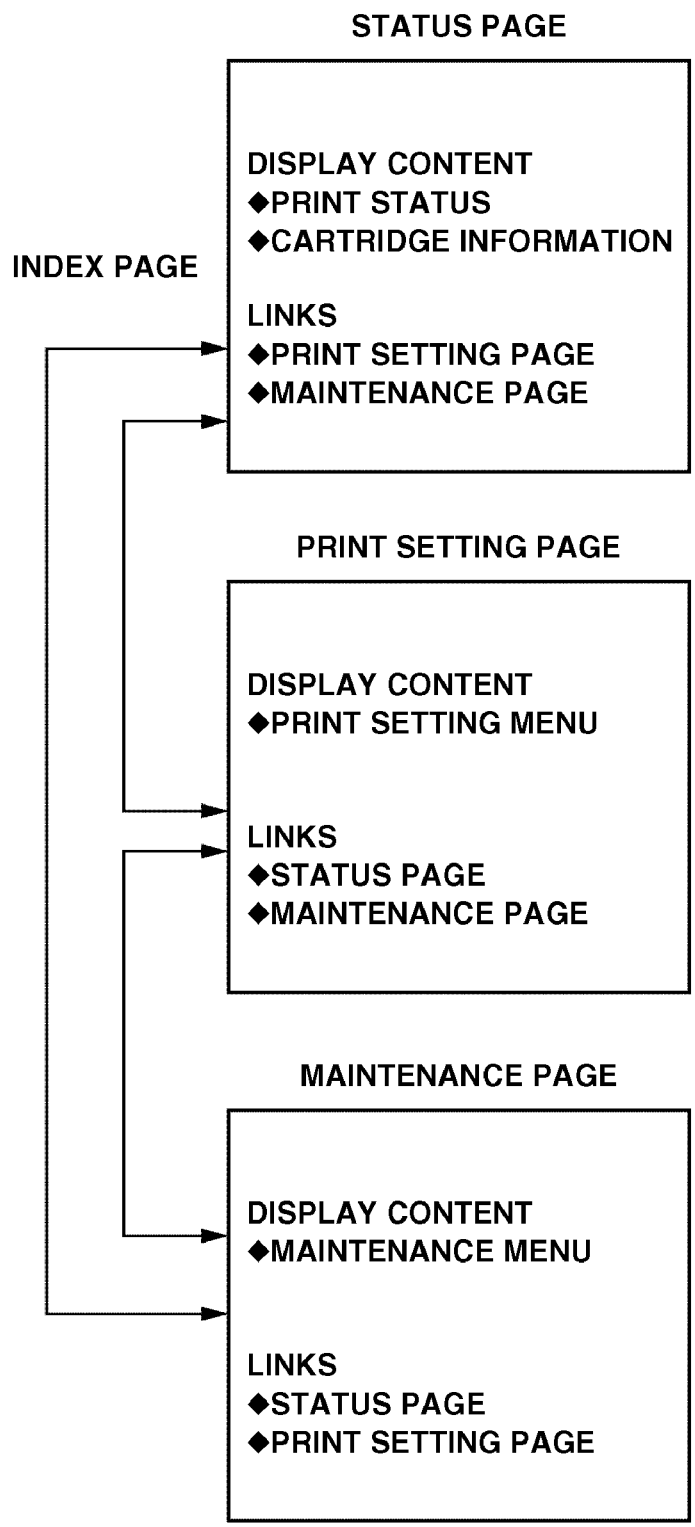
FIG. 3 is an example configuration of menu screens that is held in a printer according to an exemplary embodiment of the present invention.

FIG. 3 is a schematic diagram illustrating a structure of a group of menu screens in an HTML format that corresponds to menu information held in the menu holding unit 152 of the printer 150. As described above, the menu screen of the printer 150 is described in HTML format. In the menu screens illustrated in FIG. 3, a status page is the top menu screen, i.e., the index page, and links to a print setting page and a maintenance page, i.e., address information of such pages, are described on the status page. Further, a link (address information) to the status page is described on both the print setting page and the maintenance page. Further, a link (address information) to the maintenance page is described on the print setting page, and a link (address information) to the print setting page is described on the maintenance page. Such pages are configured as HTML files, and when a user operates on a link, the designated HTML file is read out, and a browser displays the HTML file as a menu screen.

Figure 4:
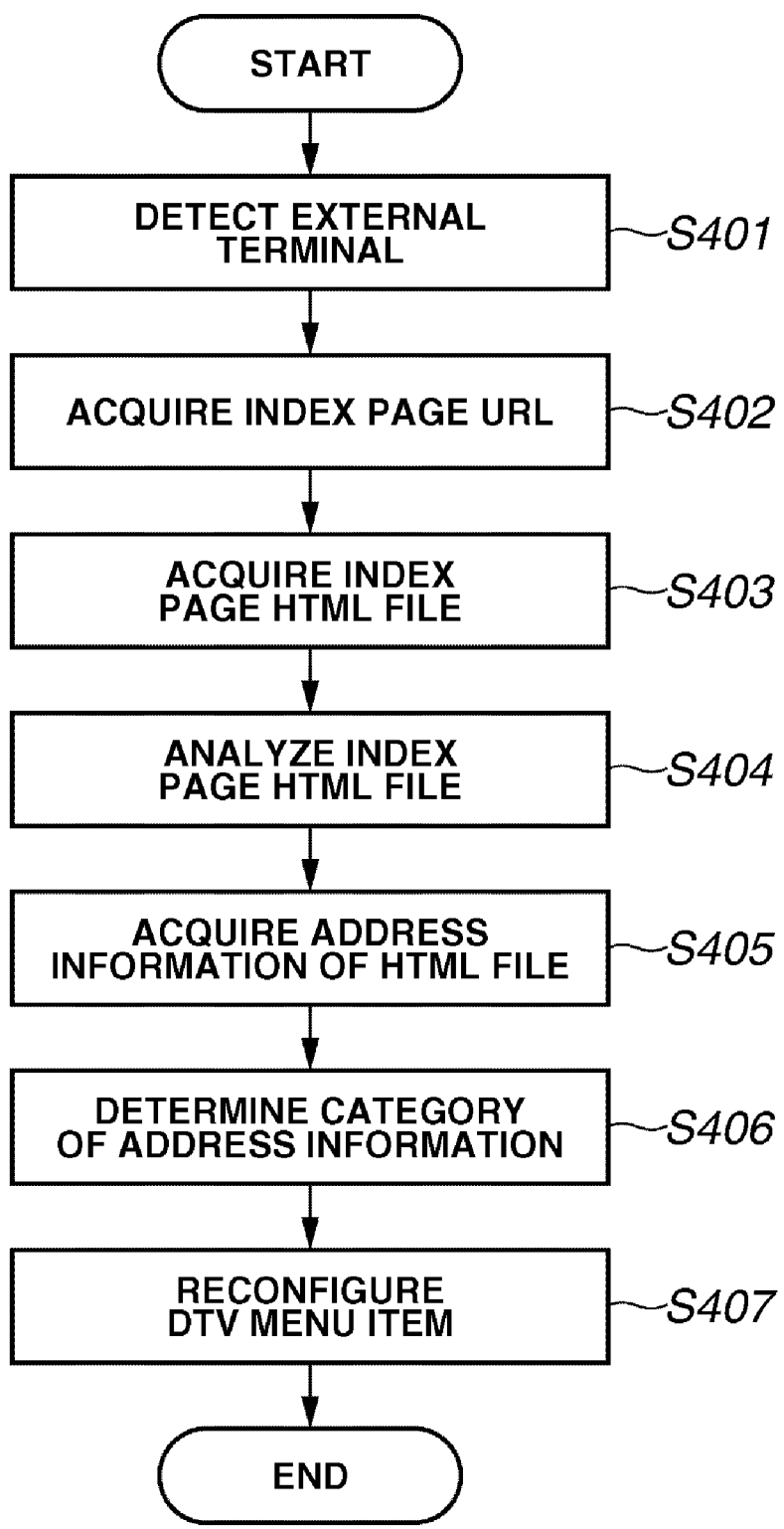
FIG. 4 illustrates a flowchart based on a process according to an exemplary embodiment of the present invention.

A control performed by the DTV 100 in a case where a new external terminal that conforms to the Net TV specification is connected to a network (LAN 140) to which the DTV 100 is connected will be described below. The control is described with reference to the flowchart illustrated in FIG. 4.

In step S401, the control unit 101 detects whether an external terminal is connected to the network. A connection of an external terminal can be detected using, for example, a discovery function specified in the universal plug and play (UPnP). An external terminal is described below as the printer 150.

If it is detected that the printer 150 is connected to the network in step S401, the process proceeds to step S402. In step S402, the control unit 101 acquires a URL indicating an index page corresponding to an initial menu screen of the printer 150. As described above, according to the Net TV specification, when a printer is connected to the network, the DTV 100 is notified of information referred to as a presentation URI. The presentation URI from the printer 150 is processed by the network processing unit 106 as an HTTP protocol, and the external terminal communication unit 105 can acquire index page URL information included in the presentation URI.

In step S403, the external terminal communication unit 105 requests the printer 150 to acquire an HTML file of the index page based on the acquired URL of the index page, according to an instruction from the control unit 101. In response to the request, the control unit 151 of the printer 150 sends an HTML file that corresponds to the URL of the index page to the DTV 100 from the menu holding unit 152 via the network processing unit 154. As illustrated in FIG. 3, since the HTML file that the printer 150 has set as an index page is an HTML file which displays status (printer status), the control unit 151 sends the HTML file that corresponds to a status page to the DTV 100.

The network processing unit 106 of the DTV 100 receives the HTML file that corresponds to the index page sent from the printer 150. The control unit 101 stores the received HTML file in the temporary storage unit 107.

In step S404, the HTML parser unit 108 analyzes the HTML file stored in the temporary storage unit 107 and separates tags and text included in the HTML file according to an instruction from the control unit 101.

In step S405, the external terminal menu address information acquiring unit 109 acquires the HTML document data that the HTML parser unit 108 has acquired by analyzing the HTML file. The external terminal menu address information acquiring unit 109 then searches for a list (LI) element in the analyzed HTML document data, and acquires a character string that indicates address information included in the LI element.

FIG. 5 illustrates how the external terminal menu address information acquiring unit 109 acquires address information. The external terminal menu address information acquiring unit 109 searches for an LI element from the HTML document data of the index page. When the LI element is found, the external terminal menu address information acquiring unit 109 determines whether link information is included in the LI element. In an HTML specification, since a link is represented by an anchor tag (<A>~</A>), the external terminal menu address information acquiring unit 109 determines whether there is an anchor tag. In the example illustrated in FIG. 5, an LI element includes <A href> element that indicates a link to an external page, and a URL circled with a broken line corresponds to address information of an HTML file of the linked page. That is, address information is unique information associated with an HTML file for identifying the HTML file. In the present embodiment, an LI element is searched, and address information included in the LI element is extracted. However, searching of an LI element is not mandatory.

If there is a link in the HTML document data acquired by analyzing the HTML file corresponding to the index page of the printer 150, the external terminal menu address information acquiring unit 109 extracts the address information of the link and sends the information to the external terminal menu category determination unit 110.

In step S406, the external terminal menu category determination unit 110 creates an address information list based on the HTML document that is analyzed by the HTML parser unit 108 and the address information sent from the external terminal menu address information acquiring unit 109.

FIG. 6 illustrates an example address information list that is held by the external terminal menu category determination unit 110. The address information list is an information list for holding menu information acquired from the printer 150, i.e., an external terminal. The external terminal menu category determination unit 110 controls to add address information sent from the external terminal menu address information acquiring unit 109 to the address information list. In a case where new address information is added to the address information list, a unique link ID is assigned to each address information.

As illustrated in FIG. 6, the address information list is a table of data in which a link ID and address information are stored associated with each other. Further, the address information list includes a menu category item and a sub-menu name item corresponding to the link ID and address information.

To integrate menu information of the printer 150 into menu information held in the DTV 100, the external terminal menu category determination unit 110 determines a category of an HTML file that corresponds to a menu screen of the printer 150.

The external terminal menu category determination unit 110 previously holds comparative information for determining a menu category of HTML files. FIG. 7 is a schematic diagram illustrating a keyword list used as comparative information. Typically, a menu category item in the keyword list is a category that corresponds to a menu item in the menu information stored in the DTV 100. Categories other than the menu items stored in the DTV 100 can be previously included. Each category in the menu category item corresponds to a keyword. A category of an HTML is determined using such keywords, as described below.

The external terminal menu category determination unit 110 first compares the address information acquired from the external terminal menu address information acquiring unit 109 and the HTML document data acquired from the HTML parser unit 108. As a result, the external terminal menu category determination unit 110 acquires an alternate (alt) attribute which is attribute information related to address information from the HTML document data. In the present embodiment, address information and alt attribute included in the HTML file are menu information of the printer 150.

FIG. 8 illustrates an example of an HTML file in which an alt attribute of a graphics interchange format (GIF) image associated with address information is described as "print setting". Basically, in HTML, if an image designated by an image (IMG) tag is not displayed, a substitute character string is designated to an alt attribute, and the character string is displayed to indicate what the image is like. In the present embodiment, a character string described in an alt attribute is associated with a content of an HTML file designated by address information. The external terminal menu category determination unit 110 compares the content described in the alt attribute and keywords in the keyword list. As a result, the external terminal menu category determination unit 110 determines a category of an HTML file that corresponds to the address information.

In the example illustrated in FIG. 8, the alt attribute is "print setting". Consequently, the external terminal menu category determination unit 110 determines that the alt attribute matches the keyword "*print*" in a "function setting" category of the keyword list illustrated in FIG. 7. Therefore, the menu category of the HTML file that corresponds to address information acquired by the external terminal menu address information acquiring unit 109 is determined as "function setting". Further, the external terminal menu category determination unit 110 sets the alt attribute as a sub-menu name. The menu category and the sub menu-name determined by the external terminal menu category determination unit 110 are held associated with the address information in an address information list. In a case where the acquired alt attribute does not match a keyword, the menu category is set as "others".

In a case where a plurality of address information exists in an HTML file data, i.e., an index page of the printer 150, the processes described in steps S405 and S406 are repeated on each address information. Moreover, it is desirable to acquire from the printer 150 HTML files designated by address information included in the index page, and perform the processes of steps S403 and the steps to follow for address information included in HTML files other than the HTML file corresponding to the index page.

Returning to FIG. 4, in step S407, the menu reconfiguration unit 111 reconfigures DTV menu items according to an instruction from the control unit 101. In the description below, the menu configuration list illustrated in FIG. 2 represents the configuration of menu items managed by the menu management unit 112 of the DTV 100.

Figure 9:
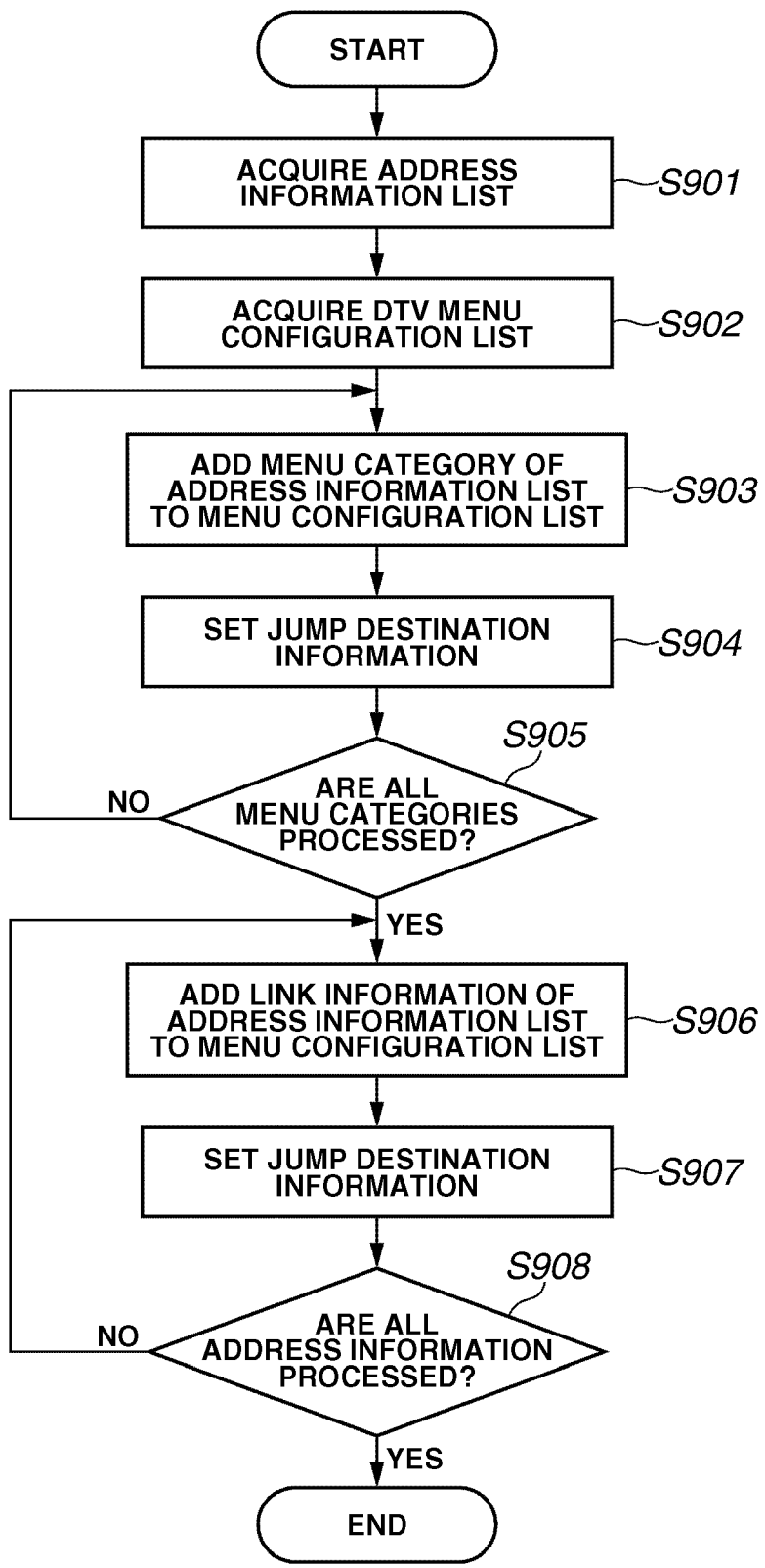
FIG. 9 illustrates a flowchart based on a menu reconfiguration process according to an exemplary embodiment of the present invention.

The reconfiguration process performed by the menu reconfiguration unit 111 is described below with reference to a flowchart illustrated in FIG. 9. FIG. 10 illustrates a menu configuration list after the menu reconfiguration unit 111 performs the reconfiguration process.

In step S901, the menu reconfiguration unit 111 acquires an address information list from the external terminal menu category determination unit 110.

In step S902, the menu reconfiguration unit 111 acquires a latest menu configuration list of the DTV 100, i.e., the menu configuration list illustrated in FIG. 2, from the menu management unit 112. In the present embodiment, the menu reconfiguration unit 111 acquires the menu configuration list from the menu management unit 112 and performs the processes described below. However, it is not necessary to acquire the menu configuration list. For example, the menu reconfiguration unit 111 can access the menu management unit 112 and change the menu configuration list stored in the menu management unit 112. Further, the menu reconfiguration unit 111 can issue an instruction to the menu management unit 112 to change the menu configuration list, so that the menu management unit 112 actually performs the reconfiguration process.

In step S903, the menu reconfiguration unit 111 adds information about a menu category included in the acquired address information list to the menu configuration list. First, the menu reconfiguration unit 111 adds a new menu ID to the menu configuration list. The menu reconfiguration unit 111 then sets a menu category name held in the "menu category" item of the address information list to the added menu ID. Further, the menu reconfiguration unit 111 sets information held in the "menu category" item in the address information list to the "menu name" item in the menu configuration list. In the present embodiment, since the menu name is actually displayed on a menu screen, the text "printer" is added to the menu category name so that it is easier for a user to understand the content of the menu.

The address information list illustrated in FIG. 6 includes five link information. The address information list further holds four menu categories, i.e., "function setting", "installation setting", "status display", and "others", in the menu category item. Consequently, the menu reconfiguration unit 111 adds the above-described four menu categories to the menu category item of the menu reconfiguration list. A menu ID is assigned to each menu category.

In the present embodiment, the process proceeds to step S904 after one menu category is added to the menu reconfiguration list. If there is a menu category to be further added, the process returns to step S903 to add another menu category.

In step S904, the menu reconfiguration unit 111 sets jump destination information on other menu IDs that are already included in the menu configuration list, to jump to the menu category added in step S903. For example, in the menu configuration list illustrated in FIG. 10, a menu ID "mid_02" corresponds to a menu screen to display a list of the menu category "status display". Therefore, the menu reconfiguration unit 111 adds "mid_101" whose menu category is also "status display" to the jump destination item of "mid_02".

As described above, the menu reconfiguration unit 111 associates the menu category added to the menu configuration list in step S903 with a related menu ID (i.e., a menu ID that already exists). Further, FIG. 10 illustrates that a jump destination "mid_104" whose menu category is "others" is set on a menu ID "mid_70". Further, a jump destination "mid_102" whose menu category is "function setting" is set on a menu ID "mid_01".

In step S905, the menu reconfiguration unit 111 determines whether all menu categories are added to the menu configuration list, and whether the added menu IDs are set as jump destinations on the menu IDs that already exist. If the menu reconfiguration unit 111 determines that the processes of steps S903 and S904 are completed on all menu categories included in the address information list (YES in step S905), the process proceeds to step S906.

In step S906, the menu reconfiguration unit 111 adds to the menu configuration list an item that corresponds to a link ID stored in the address information list. The process is performed to acquire each menu screen stored in the printer 150, i.e., each HTML file. Referring to FIG. 10, five menu IDs, from "mid_105" to "mid_109" are information added in step S906. The menu reconfiguration unit 111 sets the menu category name that corresponds to each link ID in the menu category item of the menu configuration list. Further, the menu reconfiguration unit 111 set the sub-menu name that corresponds to each link ID in the menu name item of the menu configuration list. Further, the menu reconfiguration unit 111 sets the link ID of the address information list in the jump destination item of the menu configuration list.

In step S907, the menu reconfiguration unit 111 sets the menu ID corresponding to address information added in step S906 to the jump destination item of the menu ID added in step S903. As illustrated in FIG. 10, since the menu ID of the address information for the HTML file that indicates status display is "mid_105", the menu reconfiguration unit 111 sets "mid_105" as the jump destination item of a "status display" menu category (whose menu ID is "mid_101") added in step S903.

In step S908, the menu reconfiguration unit 111 determines whether items corresponding to all of the link IDs held in the address information list are added and whether jump destination information is set. If the menu reconfiguration unit 111 determines that the processes in steps S906 and S907 are completed on all link IDs included in the address information list (YES in step S908), the process terminates. On the other hand, if the processes are not completed on all link IDs (NO in step S908), the process returns to step S906 and continues.

As a result of the above-described process, a reconfigured menu configuration list as illustrated in FIG. 10 is acquired. The menu reconfiguration unit 111 causes the menu management unit 112 to hold the reconfigured menu configuration list. Further, the menu management unit 112 acquires and holds an address information list stored in the external terminal menu category determination unit 110.

An operation of actually displaying a menu screen using a menu configuration list of the DTV 100 that is reconfigured by the menu reconfiguration unit 111 will now be described.

Figure 11:
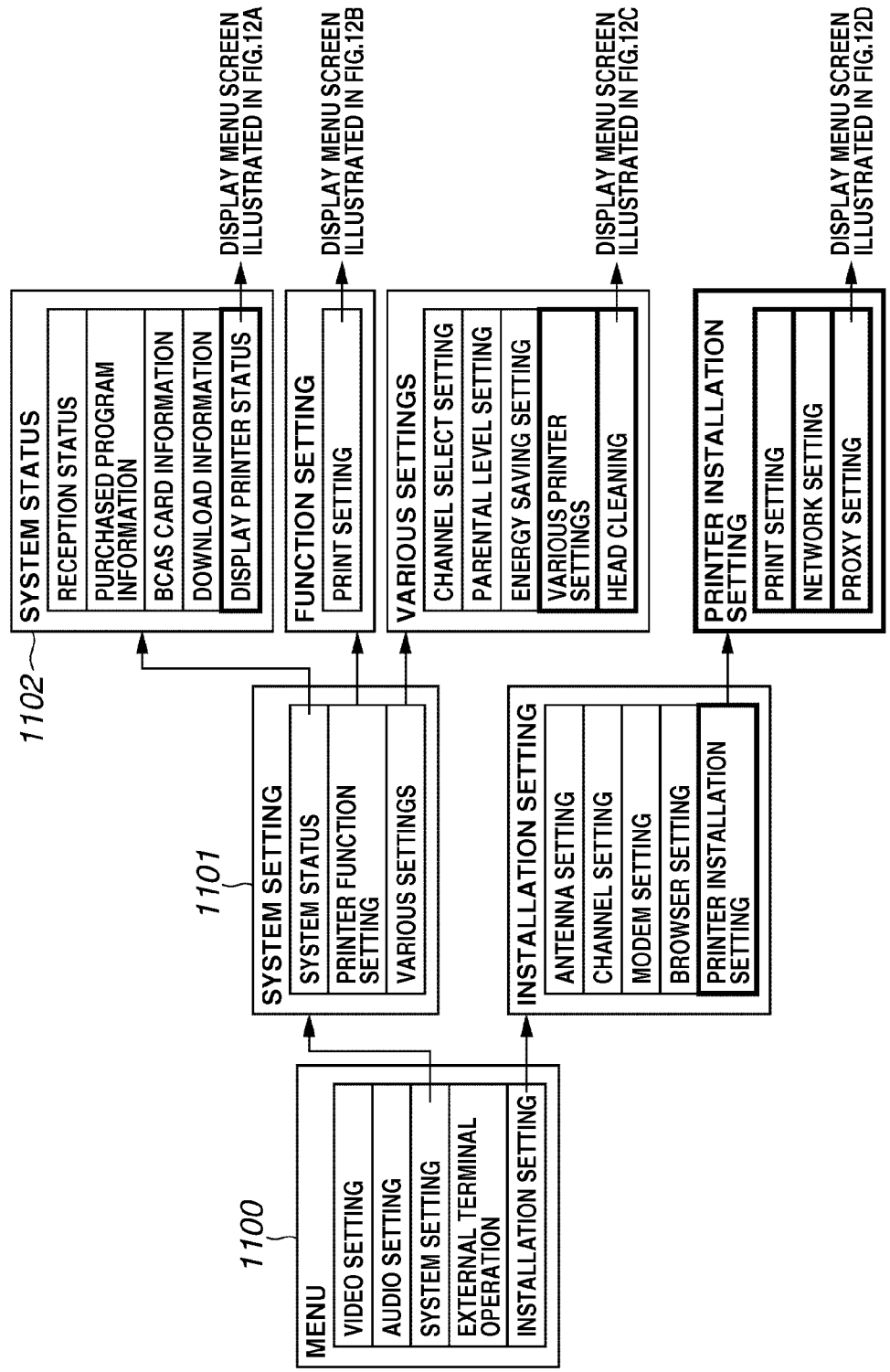
FIG. 11 illustrates an example schematic diagram of menu screens that are generated and screen transition based on a reconfigured menu configuration list according to an exemplary embodiment of the present invention.

FIGS. 11, 12A, 12B, 12C, and 12D illustrate schematic diagrams of menu screens displayed according to a menu configuration list which is reconfigured by the above-described process. FIG. 11 illustrates menu screens held in the DTV 100, i.e., screens generated according to the menu configuration list managed by the menu management unit 112. FIGS. 12A, 12B, 12C, and 12D illustrate menu screens held in the printer 150.

A user instructs display of a menu screen on the DTV 100 with a remote controller. The control unit 101 issues an instruction to the menu management unit 112 to display the menu screen of the highest hierarchy level. In FIG. 11, the menu screen of the highest hierarchy level is a menu screen 1100.

The menu management unit 112 outputs, to the rendering unit 113, information about the menu screen 1100 among menu information stored in the menu configuration list. The rendering unit 113 then renders a menu screen according to the menu information output from the menu management unit 112 and outputs the rendered menu screen to the video synthesis unit 114.

If the user selects "system setting" from the menu category item of the displayed menu screen 1100, the control unit 101 issues an instruction to the menu management unit 112 to display a system setting menu screen 1101. The menu management 112 and the rendering unit 113 then perform similar processes to those performed on the menu screen 1100.

If the user further selects "system status" from the menu category item in the system setting menu screen 1101, the control unit 101 issues an instruction to the menu management unit 112 to display a system status menu screen 1102.

In the menu configuration list illustrated in FIG. 10, a printer status display indicated by "mid_101" is set as a jump destination on a system status menu indicated by "mid_02". Consequently, if the user selects "system status" from the menu category item in the system setting menu screen 1101, the system status screen 1102 that includes "display printer status" as a menu item is rendered and displayed. The system status screen 1102 displays a menu item "display printer status" that corresponds to "mid_101".

If the user selects "display printer status" on the system status screen 1102, a "print status" menu that corresponds to "mid_105" which is designated as the jump destination of "mid_101" is specified. The jump destination of "mid_105" is a link ID that corresponds to a URL of an HTML file which displays a print status of the printer 150.

The menu management 112 then acquires the URL of the linked HTML file from the address information list based on the link ID. After acquiring the URL, the menu management unit 112 requests the printer 150 via the external terminal communication unit 105 and the network processing unit 106 to acquire the HTML file that corresponds to the URL.

Figure 12A:
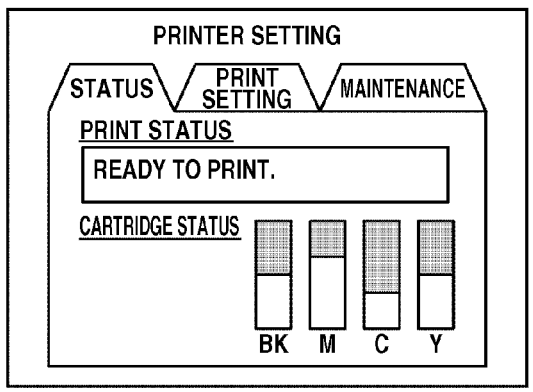
FIGS. 12A, 12B, 12C, and 12D illustrate example menu screens of a printer according to an exemplary embodiment of the present invention.
Figure 12B:
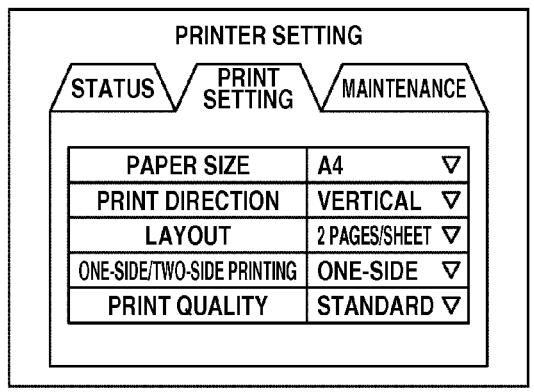
Figure 12C:
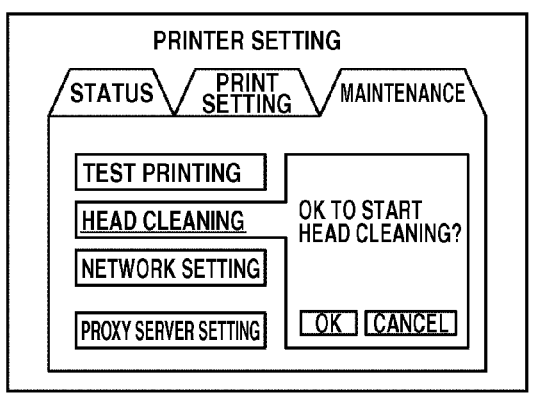
Figure 12D:
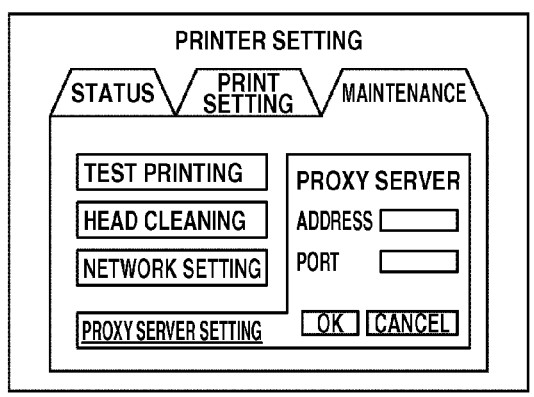

FIG. 12A illustrates a menu screen that the menu management unit 112 has requested to acquire based on the URL. The printer 150 sends the HTML file corresponding to the requested menu screen to the network processing unit 106 via the LAN 140.

After acquiring the HTML file sent from the printer 150, the network processing unit 106 stores the HTML file in the temporary storage unit 107. The HTML parser unit 108 then analyzes the temporarily stored HTML file.

The analysis by the HTML parser unit 108 generates HTML document data. The rendering unit 113 renders the generated HTML document data, and an HTML page as illustrated in FIG. 12A is displayed on a display unit.

The reconfigured menu configuration list managed by the menu management unit 112 integrates address information of HTML files other than the index page of the printer 150, similar to the HTML file corresponding to the above-described print status menu screen. Conventionally, a DTV displays various menu screens of a printer by accessing to the printer from an external terminal menu and tracing links from the index page. As described above, according to the present embodiment, the DTV 100 can directly display various menu screens of the printer 150.

Further, as illustrated in FIGS. 11, 12A, 12B, 12C, and 12D, address information of a menu screen for using "printer installation setting" is integrated as a menu category of the installation setting menu screen already held by the DTV 100. Consequently, a user can access a menu screen that corresponds to "installation setting" in the menu of the DTV 100 without regard to the terminal.

As described above, according to the present embodiment, the DTV 100 acquires menu information stored in the printer 150 which is an external terminal. The DTV 100 integrates the acquired menu information and the menu information that the DTV 100 previously holds. The menu information stored in the printer 150 is acquired from a content described in an HTML file that configures the menu information of the printer 150. The DTV 100 associates the menu information acquired from the printer 150 with the menu items of the DTV 100.

By performing the above-described process, the DTV 100 can integrate menu items of an external terminal with menu items that the DTV 100 holds without previously setting a specific rule for integrating menu items between terminals.

Therefore, a user is provided with an external terminal control apparatus and a control method of an external terminal control apparatus that enable the user to operate the external terminal without regard to the difference in terminals.

In the above-described embodiment, a description of an alt attribute included in an IMG tag is used in determining a category that corresponds to address information of an HTML file. However, the present invention is not limited to the above-described technique, and, for example, a description of a title attribute can be used instead. The title attribute can be described in an IMG tag and anchor tag. Consequently, if a link to another page is to be associated with a text, the definition of the link can be described by using a title attribute instead of an alt attribute which cannot be used in such a case.

Moreover, a file path name of a URL or a file name of a GIF image can be used in addition to an alt attribute and a title attribute.

Further, the present embodiment supposes that a menu screen of an external terminal is created in an HTML format. However, the present invention can realize a process similar to the above-described process in a case where a menu screen of an external terminal is described in other markup languages such as Extensible Markup Language (XML), Broadcast Markup Language (BML), or scalable vector graphics (SVG).

Further, the present embodiment supposes that the printer 150 and the DTV 100 both conform to the Net TV specification. However, the printer 150 and the DTV 100 do not need to conform to the Net TV specification. The present invention can be realized if an external terminal control apparatus such as a DTV 100 can obtain menu information of a menu screen of an external terminal such as a printer 150 by any method.

The above-described exemplary embodiments of the present invention can also be achieved by software (program code) read and executed by a computer (central processing unit (CPU) or micro-processing unit (MPU)) of a system or an apparatus.

In this case, the computer executable program provided for the computer itself realizes the operations of the above-mentioned exemplary embodiments. That is, the computer executable program itself constitutes the present invention.

A computer executable program to implement the above-mentioned exemplary embodiments can take any form readable by computer, for example, an object code, a program executed by an interpreter, or script data supplied to an operating system (OS).

Furthermore, such computer executable program can be provided to the computer of the system or the apparatus on a storage medium or through a wire or wireless communication. The storage medium can be, for example, a floppy disk, a hard disk, a magnetic storage medium such as a magnetic tape, an optical/magneto-optical storage medium such as, a magneto-optical disk (MO), a compact disc (CD), a digital versatile disc (DVD), a nonvolatile semiconductor memory, and so on.

Such computer executable program can be provided to the computer through a wire or wireless communication using a server on a computer network. In such a case, a data file (program file) which can be computer executable program and constitute the present invention is stored in the server. The program can be in an executable format or a source code.

The program file is provided to a client computer that accesses the server by downloading. The program file can be divided into a plurality of segment files, and each segment file can be downloaded from different servers.

Namely, the present invention can be applied to a server that allows a client computer to download the program file so that the functions or processes of the present invention can be realized on the client computer.

Furthermore, a computer executable program that implements the above-mentioned exemplary embodiments can be encrypted and stored in a storage medium which is distributed to users. A user who meets predetermined requirements can obtain the key information for decrypting the program, for example by downloading from a web page through the Internet. By using the key information, the encrypted program can be installed in the user's computer.

A computer executable program that implements the above-described exemplary embodiments can use functions of an OS or the like working on a computer.

Furthermore, all or part of a computer executable program that implements the above-described exemplary embodiments can be configured with a firmware such as a function expansion board inserted in a computer and executed by a CPU equipped in the function expansion board.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-102943 filed Apr. 10, 2007, which is hereby incorporated by reference herein in its entirety.

What is claimed is:

1. An external terminal control apparatus comprising:
   a holding unit configured to hold menu information of a first group of menu screens for operating an external terminal control apparatus, wherein the menu information is classified into a predetermined plurality of categories;
   a file acquisition unit configured to acquire file data that configure a second group of menu screens for operating an external terminal;
   an address acquisition unit configured to acquire address information corresponding to each of the file data;
   a determination unit configured to associate the plurality of categories with address information acquired by the address acquisition unit; and,
   a control unit configured to add a menu item corresponding to the address information to the menu information according to a category associated with the address information by the determination unit.

2. An external terminal control apparatus according to claim 1, wherein the determination unit acquires attribute information described in the file data and related to the address information, and associates the address information with the plurality of categories using the acquired attribute information and comparative information previously set for determining the plurality of categories.

3. An external terminal control apparatus according to claim 1, wherein the control unit further adds information for jumping to the menu item to a predetermined menu screen of the first group of menu screens.

4. An external terminal control apparatus according to claim 3, wherein the determination unit acquires attribute information described in the file data and related to the address information, and associates the address information with the plurality of categories using the acquired attribute information and comparative information previously set for determining the plurality of categories.

5. An external terminal control apparatus according to claim 1, wherein the file data is described in a markup language.

6. An external terminal control apparatus according to claim 1, wherein the address information corresponding to each of the file data is acquired from the file data itself.

7. A method for controlling an external terminal control apparatus, the method comprising:
   holding menu information of a first group of menu screens for operating the external terminal control apparatus, wherein the menu information is classified into a predetermined plurality of categories;
   acquiring file data that configure a second group of menu screens for operating an external terminal;
   acquiring address information corresponding to each file data;
   associating the plurality of categories with acquired address information; and,
   adding a menu item corresponding to the address information to the menu information according to a category associated with the address information.

8. A method according to claim 7, further comprising acquiring attribute information described in the file data and related to the address information, and associating the address information with the plurality of categories using acquired attribute information and comparative information previously set for determining the plurality of categories.

9. A method according to claim 7, further comprising adding information for jumping to the menu item to a predetermined menu screen of the first group of menu screens.

10. A method according to claim 9, further comprising acquiring attribute information described in the file data and related to the address information, and associating the address information with the plurality of categories using acquired attribute information and comparative information previously set for determining the plurality of categories.

11. A method according to claim 7, wherein the file data is described using a markup language.

12. A method according to claim 7, wherein the address information corresponding to each of the file data is acquired from the file data itself.

* * * * *